W. KENYON.
GAS PIPE CUTTER.
No. 29,602.
Patented Aug. 14, 1860.
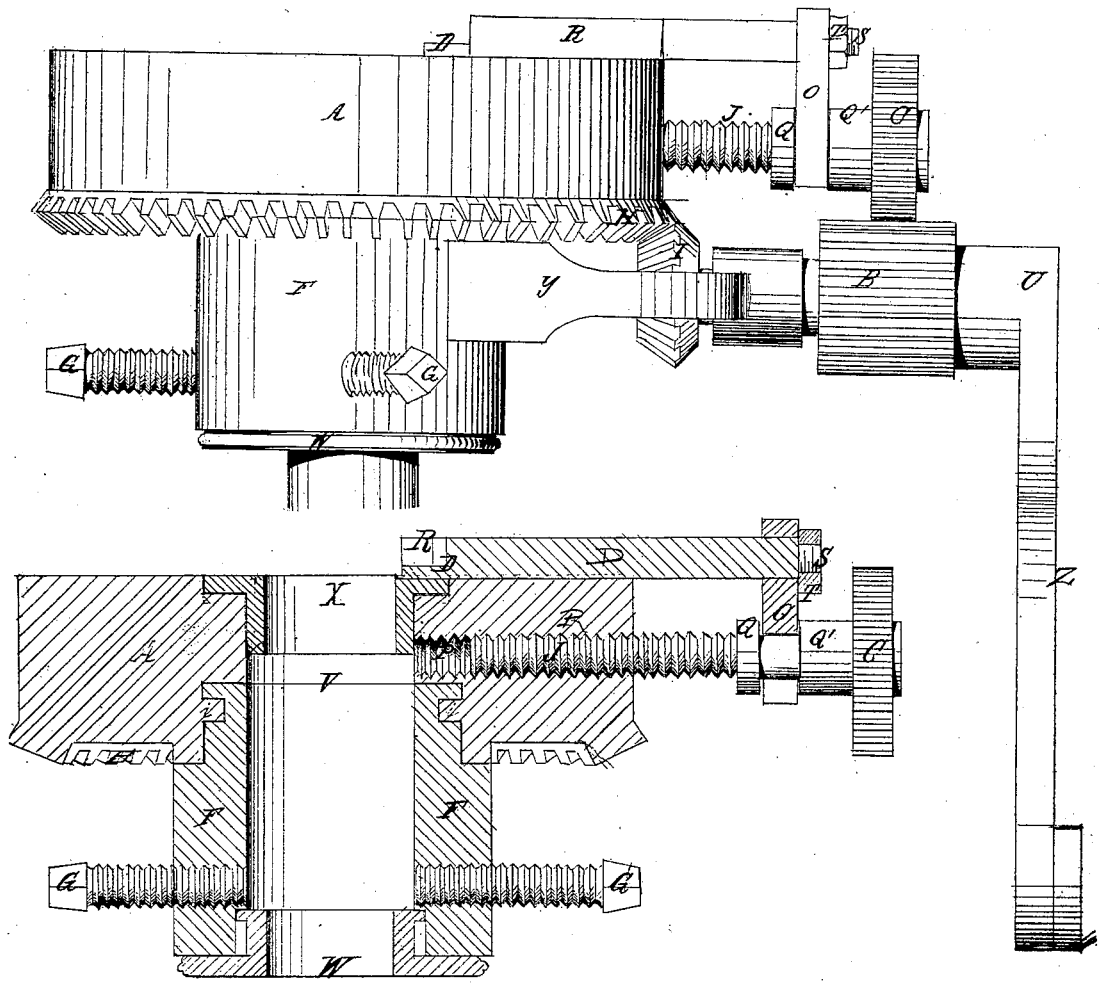

UNITED STATES PATENT OFFICE.

WILLIAM KENYON, OF STEUBENVILLE, OHIO.

GAS-PIPE CUTTER.

Specification of Letters Patent No. 29,602, dated August 14, 1860.

*To all whom it may concern:*

Be it known that I, WILLIAM KENYON, of Steubenville, in the county of Jefferson and State of Ohio, have invented a new and useful Improvement in Gas-Pipe Cutters; and I do hereby declare that the following is a full, clear, and exact description of the same, reference being had to the accompanying drawings, forming a part of this specification, in which—

Figure 1, represents a side view, and Fig. 2, a central vertical section of the implement.

Similar letters of reference, in each of the several figures indicate corresponding parts.

The nature of my invention consists in the combination of the chisel of a gas pipe cutter, with a stationary and a revolving chuck, a crank shaft, bevel gearing, cog wheels and screw shaft or their equivalents, for the purpose of revolving the chuck and feeding the cutting tool forward by the automatic action of the parts of the implement.

To enable others, skilled in the art, to make and use my invention, I will proceed to describe its construction and operation.

The main part of the implement consists of two cylinder chucks F, and A, the outer diameter of F, being smaller than that of A. The two chucks are fitted together—by means of nut and groove $i$, or in any other suitable manner—so that they can not come apart, while they are free to revolve in relation to each other. A hole V, is made clear through the center of the chucks. A collar W, is fitted into the end of the hole in chuck F, and another collar X, of the same diameter, is placed into the end of the hole in chuck A. The inner diameter of these collars is somewhat smaller than that of the hole V, and is intended to be equal to the outer diameter of the gas pipe to be cut. The collars are—in any suitable manner—fitted into the ends of the chucks so that they can be removed and replaced by others of a suitable inner diameter whenever pipes of different outer diameter are to be cut.

The pipe E, having been inserted through the collars W, and X, is then firmly secured by three clamp screws G, which are screwed through the body of the chuck F.

A stirrup Y, extends from the stationary chuck F, so as to serve as a bearing for a crank shaft V. This crank shaft is provided with a bevel wheel I, inside the stirrup, and with a cog wheel B, outside of the stirrup. The bevel wheel I, is in gear with a larger bevel wheel H, fastened to the under surface of chuck A.

The cutting tool or chisel D, is made with a shank which fits and slides in a dovetail groove R, in the top of chuck A. The outer end of this shank is secured to a bracket O, by means of screw S, and nut T. This bracket serves as a bearing for a shaft J, the inner end of which is screw threaded and screws into screw hole P, cut into the body of chuck A, the screw hole being parallel to the path of the chisel. This shaft J, is prevented from playing laterally in its bearing by means of collars Q, Q′, secured to the shaft at both sides of the bracket O. A cog-wheel C, is keyed to the outer end of shaft J.

As the crank Z, is revolved, the pipe E, being held in a vise and consequently being stationary together with chuck F, the bevel wheel I, revolves and taking into bevel wheel H, causes the chuck A, to revolve so as to cause the chisel to cut all around the pipe. Once during each revolution of chuck A, the chisel passes underneath the crank shaft, when the cog wheel B, will take into cog wheel C, and turn the latter part of a revolution. The screw shaft J, screws into hole P, and thereby advances the bracket and with it the chisel toward the center of the pipe, so as to cause the chisel to cut deeper during the next revolution of chuck A, and so on until the pipe has been cut through.

The teeth of cog wheel B, are of sufficient length to remain in gear with the teeth of cog wheel C, during all the advance of the latter necessary to cut through the whole thickness of the pipe.

This is a simple and self adjusting implement which facilitates the operation of cutting gas pipes very considerably.

The machine can be used for cutting solid bars as well as for cutting tubing.

What I claim as my invention and desire to secure by Letters Patent, is—

The combination of a chisel D, of a gas pipe cutter, with a stationary and a revolving chuck F, and A, a crank shaft U, bevel gearing I, H, cog wheels B, C, and screw shaft J, or their equivalents for the purpose of revolving the chuck F, and feeding the cutting tool D, forward, by the automatic action of the parts of the implement, substantially as set forth.

WILLIAM KENYON.

Witnesses:
GEORGE McFEELY,
JAMES GREGG.